United States Patent Office 3,767,660
Patented Oct. 23, 1973

3,767,660
4H-s-TRIAZOLO[4,3-a][1,4]BENZODIAZEPINES
Jackson B. Hester, Jr., Galesburg, Mich., assignor to
The Upjohn Company, Kalamazoo, Mich.
No Drawing. Filed Sept. 13, 1971, Ser. No. 180,210
The portion of the term of the patent subsequent to
Jan. 9, 1990, has been disclaimed
Int. Cl. C07d 99/02
U.S. Cl. 260—294.9          5 Claims

ABSTRACT OF THE DISCLOSURE

This invention relates to novel substituted 4H-s-triazolo-[4,3-a][1,4]benzodiazepines embraced by the formula

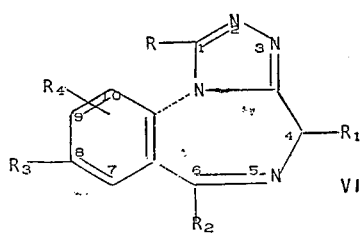

wherein R is selected from the group consisting of chlorine, bromine, cyano, OR' wherein R' is alkyl of 1 through 3 carbon atoms and

wherein R'' and R''' are each alkyl of 1 through 3 carbon atoms and together

is selected from the group consisting of pyrrolidino, piperidino and morpholino; $R_1$ is selecte dfrom the group consisting of hydrogen and alkyl of 1 through 3 carbon atoms; $R_2$ is selected from the group consisting of pyridyl, 2-pyrimidyl, furyl, pyrryl, thienyl, lower alkyl of 1 through 3 carbon atoms, lower alkenyl of 2 through 3 carbon atoms, cycloalkyl of 5 through 7 carbon atoms and cycloalkenyl of 5 through 7 carbon atoms; $R_3$ and $R_4$ are selected from the group consisting of hydrogen, halogen, nitro, trifluoromethyl, lower alkoxy of 1 through 3 carbon atoms, lower alkylthio of 1 through 3 carbon atoms and lower dialkylamino having lower alkyl moieties of 1 through 3 carbon atoms; and pharmacologically acceptable acid addition salts thereof. It also relates to processes for their preparation. The new products of Formula VI are useful as sedatives, hypnotics, anticonvulsants, tranquilizers and muscle relaxants in mammals and birds, and as feed additives for livestock and poultry.

BRIEF SUMMARY OF THE INVENTION

This invention is directed to new benzodiazepines and is particularly concerned with novel 1,6-disubstituted-4H-s-triazolo[4,3-a][1,4]benzodiazepines embraced by Formula VI, above, and process for their production. The 1-substituent here is selected from the group consisting of chlorine, bromine, cyano, OR' wherein R' is alkyl of 1 through 3 carbon atoms and

wherein R'' and R''' are each alkyl of 1 through 3 carbon atoms and together

is selected from the group consisting of pyrrolidino, pyridino and morpholino; the 6-substituent is selected from the group consisting of pyridyl, 2-pyrimidyl, furyl, pyrryl, thienyl, lower alkyl of 1 through 3 carbon atoms, lower alkenyl of 2 through 3 carbon atoms, cycloalkyl of 5 through 7 carbon atoms and cycloalkenyl of 5 through 7 carbon atoms.

The novel compounds of this invention and processes for their production are represented by the following sequence of formulae

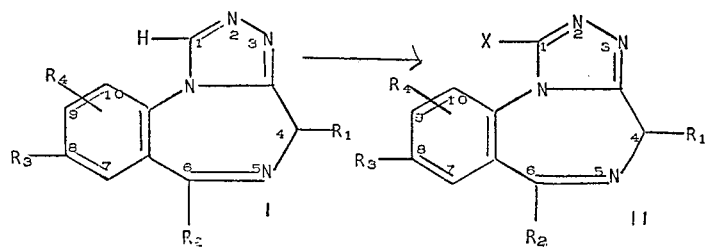

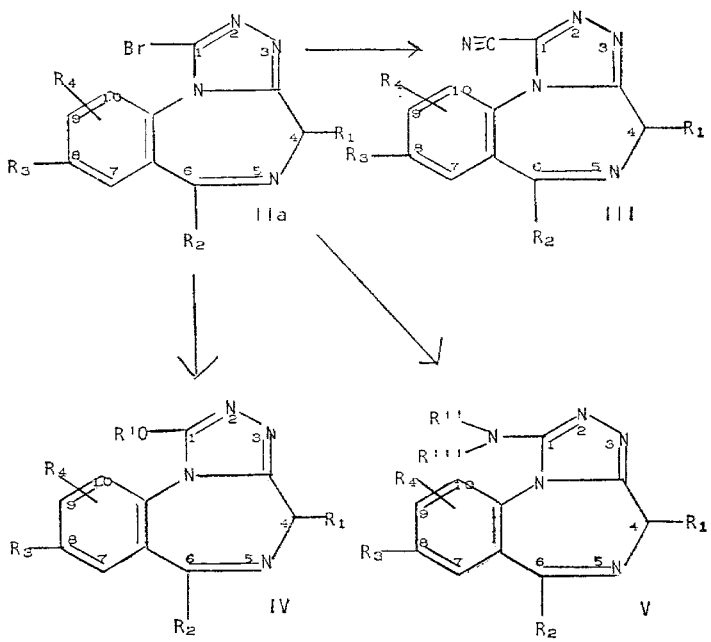

wherein R' is alkyl of 1 through 3 carbon atoms; R" and R''' are each alkyl of 1 through 3 carbon atoms and together

is selected from the group consisting of pyrrolidino, piperidino and morpholino; $R_1$ is selected from the group consisting of hydrogen and alkyl of 1 through 3 carbon atoms; $R_2$ is selected from the group consisting of pyridyl, 2-pyrimidyl, furyl, pyrryl, thienyl, lower alkyl of 1 through 3 carbon atoms, lower alkenyl of 2 through 3 carbon atoms, cycloalkyl of 5 through 7 carbon atoms and cycloalkenyl of 5 through 7 carbon atoms; $R_3$ and $R_4$ are selected from the group consisting of hydrogen, halogen, nitro, trifluoromethyl, lower alkoxy of 1 through 3 carbon atoms, lower alkylthio of 1 through 3 carbon atoms and lower dialkylamino having lower alkyl moieties of 1 through 3 carbon atoms; X is selected from the group consisting of chlorine and bromine; and pharmacologically acceptable acid addition salts thereof.

The new Compounds II, III, IV and V of this invention are included within the generic formula

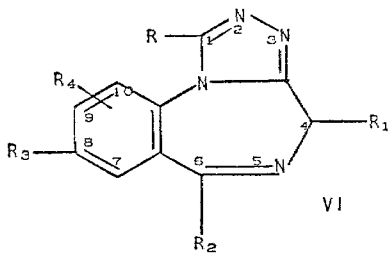

wherein R is selected from the group consisting of chlorine, bromine, cyano, OR' wherein R' is alkyl of 1 through 3 carbon atoms and

are each alkyl of 1 through 3 carbon atoms and together

is selected from the group consisting of pyrrolidino, piperidino and morpholino; $R_1$ is selected from the group consisting of hydrogen and alkyl of 1 through 3 carbon atoms; $R_2$ is selected from the group consisting of pyridyl, 2-pyrimidyl, furyl, pyrryl, thienyl, lower alkyl of 1 through 3 carbon atoms, lower alkenyl of 2 through 3 carbon atoms, cycloalkyl of 5 through 7 carbon atoms and cycloalkenyl of 5 through 7 carbon atoms; $R_3$ and $R_4$ are selected from the group consisting of hydrogen, halogen, nitro, trifluoromethyl, lower alkoxy of 1 through 3 carbon atoms, lower alkylthio of 1 through 3 carbon atoms and lower dialkylamino having lower alkyl moieties of 1 through 3 carbon atoms; and pharmacologically acceptable acid addition salts thereof.

Examples of lower alkyl include methyl, ethyl, propyl and isopropyl. Examples of lower alkenyl of 2 through 3 carbon atoms include vinyl, 1-propenyl and isopropenyl. Examples of cycloalkyl of 5 through 7 carbon atoms include cyclopentyl, cyclohexyl and cycloheptyl. Examples of cycloalkenyl of 5 through 7 carbon atoms include 1-cyclopentyl, 1-cyclohexenyl and 1-cycloheptenyl. Examples of lower alkoxy of 1 through 3 carbon atoms, include methoxy, ethoxy, propoxy and isopropoxy. Examples of lower dialkylamino having lower alkyl moieties of 1 through 3 carbon atoms include dimethylamino, diethylamino, methylethylamino, methylpropylamino, ethylpropylamino, dipropylamino, diisopropylamino, methylisopropylamino and ethylisopropylamino.

The novel compounds of Formula VI of this invention are inclusive of their pharmacologically acceptable acid addition salts, e.g., the hydrochlorides, hydrobromides, hydroiodides, sulfates, phosphates, cyclohexanesulfamates, methanesulfonates, and the like, prepared by reacting a compound of Formula VI with an excess of the selected pharmacologically acceptable acid.

The compounds of Formula VI in free base form or its acid addition salts can be used as sedatives, hypnotics, anticonvulsants, tranquilizers and muscle relaxants in mammals and birds and also as feed additives for increasing growth rate and feed efficiency of livestock and poultry, milk production during lactation in the mammalian species and egg production in the avian species. The free base or acid addition salt forms of the compounds of Formula VI can be used in treating mammals and birds in the same way that the known muscle relaxants such as diazepam or mephenesin are used, with due regard to appropriate adjustment of dosages to the activities of VI.

The pharmaceutical forms contemplated by this invention include pharmaceutical compositions suited for oral, parenteral, and rectal use, e.g., tablets, powders packets, cachets, dragées, capsules, solutions, suspensions, sterile injectable forms, suppositories, bougies, and the like. Suitable diluents or carriers such as carbohydrates (lactose), proteins, lipids, calcium phosphate, corn starch, stearic acid, methylcellulose and the like may be used as carriers or for coating purposes. Oil, e.g., coconut oil, sesame oil, safflower oil, cottonseed oil, peanut oil may be used for preparing solutions or suspensions of the active drug. Sweetening, coloring and flavoring agents may be added.

For mammals and birds, food premixes with starch, oatmeal, dried fishmeat, fishmeal, flour and the like can be prepared. As sedatives, hypnotics, anticonvulsants, tranquilizers and muscle relaxants, the compounds of Formula VI and their pharmacologically acceptable acid addition salts can be used in dosages of about 0.01 mg. to about 2 mg./kg. in oral and injectable preparations. They can be used to alleviate muscle cramps in pets and domestic animals as occur, for example, after strenuous activity; to alleviate tension and anxiety in mammals or birds, e.g., such as occurs in travel. As feed additives the compounds of Formula VI and their pharmacologically acceptable acid addition salts can be used in dosages of 0.003 mg. to 50 mg./animal/day in a feed, to increase growth, feed consumption and feed efficiency in livestock and poultry, milk production in the mammalian species and egg production in the avian species.

The starting compounds of Formula I are prepared in the manner described in Example 1, the starting materials thereof being prepared as shown in Preparations 1 and 2.

In carrying out the process of this invention, a selected 6-substituted - 4H - s - triazolo[4,3-a][1,4]benzodiazepine (I) is heated with a halogenating agent providing a chloro or bromo atom for the halogenation. Halogenating agents for this reaction are N-bromo- and N-chloroacetamide and preferably N-chloro- and N-bromo succinimide. The reaction is carried out in an inert organic solvent, e.g., methylene chloride, chloroform, carbon tetrachloride, ethylene dichloride and the like at a temperature of 40-60° C., preferably at the reflux temperature of the mixture for a period of 2 to 8 hours. The product, thus obtained, a 1-chloro- or 1-bromo-6-substituted-4H-s-triazolo[4,3-a][1,4]benzodiazepine (II) is recovered and purified by conventional procedures, e.g., extraction, chromatography, crystallization and the like.

Compound IIa, a 1-bromo-6-substituted-4H-s-triazolo-[4,3-a][1,4]benzoidazepine, i.e., a Compound II in which the 1-position is substituted with bromine, is converted to a 1-cyano 6-substituted - 4H - s - triazolo[4,3-a][1,4] benzodiazepine (III) by heating it with cuprous cyanide in a high-boiling organic solvent for 1 to 5 hours between 120–170° C. Solvents useful for this purpose are dimethylformamide, diethylformamide, dipropylformamide, dimethylacetamide, diethyl acetamide, xylenes, trimethylbenzenes and the like. After the reaction is terminated, the product III is isolated and purified by conventional procedures, i.e., extraction, chromatography, crystallization, and the like.

1-alkoxy-6-substituted-4H - s - triazolo[4,3-a][1,4]benzodiazepines (IV) are produced from compounds IIa by heating a selected compound IIa with an alkali metal salt of an alkanol in an excess of the lower alkanol conveniently at reflux or between 60–97° C. for fifteen minutes to 2 hours. Useful alkoxides of this type are sodium and potassium methoxide, ethoxide, propoxide and isopropoxide with a solvent of the same type, i.e., methanol, ethanol, and 1- and 2-propanol. At the termination, the mixture is preferably poured into excess water and extracted with a water-immiscible solvent. The extracted products are purified by conventional procedures e.g., chromatography and crystallizations.

Compounds of Formula IIa can be reacted with an amine of the formula

in which

is defined as above, to give the corresponding 1-amino-6-substituted - 4H - s - triazolo[4,3-a][1,4]benzodiazepine (V). This reaction is preferably carried out between 55–100° C. with or without a solvent. As solvent, ethanol, propanol, dioxane, tetrahydrofuran, dibutyl ether, hexamethylphosphoric acid amide, or the like can be used or just an excess of amine. Diethylamine, dipropylamine, diisopropylamino, pyrrolidine, piperidine and morpholine can be used in this manner to obtain the corresponding 1 - substituted amino-6-substituted-4H-s-triazolo[4,3-a]-[1,4]benzodiazepine (V). For dimethylamine a solvent is used or sealed tube techniques are necessary, due to its low boiling point. The time of reaction is 1–18 hours. An alkali metal salt of the amine e.g. sodium dimethylamide in a solvent can be used in this reaction. After termination of the reaction, the product V is isolated and purified by conventional procedures, i.e., extraction chromatography, crystallization and the like.

The 6-substituents of the compounds of Formulae I through VI are selected from the group consisting of pyridyl, 2-pyrimidyl, furyl, pyrryl, thienyl, lower alkyl of 1 through 3 carbon atoms, lower alkenyl of 2 through 3 carbon atoms, cycloalkyl of 5 through 7 carbon atoms and cycloalkenyl, of 5 through 7 carbon atoms.

DETAILED DESCRIPTION OF THE INVENTION

The following preparations and examples are illustrative of the processes and products of the present invention, but are not to be construed as limiting.

PREPARATION 1

7-bromo-1,3-dihydro-5-(2-pyridyl)-2H-1,4-benzodiazepine-2-thione

A stirred solution of 6.53 g. of 7-bromo-1,3-dihydro-5-(2-pyridyl)-2H-1,4-benzodiazepin-2-one (prepared as in J. Pharm. Sci. 53, 264) in 400 ml. of dry pyridine is heated in an oil bath, under nitrogen, with 5.05 g. of phosphorus pentasulfide at between about 110 to 120° C. for about 1 hour, cooled and concentrated under vacuum. Pyridine remaining in the residue is removed by the successive addition of xylene and toluene with vacuum concentration after each addition of solvent. The dark brown solid residue is triturated with a mixture of aqueous sodium carbonate solution and chloroform and the resulting finely divided tan solid is collected by filtration, washed with water, dissolved in a mixture of chloroform and ethanol, decolorized with activated carbon and crystallized to yield 3.39 g. of product melting at 249° C. (with decomposition) and 0.559 g. melting at 243° C. (with decomposition). The analytical sample is crystallized from ethanol to give pure 7-bromo-1,3-dihydro-5-(2-pyridyl)-2H-1,4-benzodiazepine-2-thione, with a melting point of 245 to 246° C. (with decomposition) and ultraviolet spectrum (ethanol) which had end absorption, $\lambda_{max.}$ 219 m$\mu$ ($\epsilon$=21,050), $\lambda_{max.}$ 302 m$\mu$ ($\epsilon$=24,100).

*Analysis.*—Calcd. for $C_{14}H_{10}BrN_3S$ (percent): C, 50.61; H, 3.03; Br, 24.06; N 12.65; S, 9.65. Found (percent): C, 49.82; H, 3.31; Br, 24.31; N, 12.60; S, 9.59.

PREPARATION 2

7-chloro-1,3-dihydro-5-methyl-2H-1,4-benzodiazepine-2-thione

To a hot solution of 1 g. (5 mmoles) of 7-chloro-1,3-dihydro-5-methyl - 2H - 1,4 - benzodiazepin -2-one (prepared as in French Patent 1,391,752) in 150 ml. of xylene, 1.1 g. (5 mmoles) of phosphorus pentasulfide is added. The mixture is heated under reflux in a nitrogen atmosphere for about 4 hours. The reaction mixture is cooled and filtered with the filtrate containing only a small amount of material. The filtered solid is treated with hot water and filtered again. The filtrate is treated with 20% sodium hydroxide to give a pH of 6 to 8 and the white solid removed by extraction with ethyl acetate to give 129 mg. of crude product. The initial solid is again treated with water, the aqueous phase made basic with sodium bicarbonate and then extracted with hot ethyl acetate to give 1 g. of brown solid. This material plus the 129 mg. of crude product are chromatographed on 130 g. of silica gel using 50% ethyl acetate, 50% cyclohexane as eluting solvent. The product taken from the column is recrystallized from ethyl acetate to give 455 mg. of product, having a melting point of 205 to 206° C. (with decomposition). A previously prepared sample of the product, 7-chloro-1,3-dihydro-5-methyl-2H - 1,4 - benzodiazepine-2-thione, melts at 201 to 203° C. and gives the analysis that follows:

*Analysis.*—Calcd. for $C_{10}H_9ClN_2S$ (percent): C, 53.45; H, 4.04; N, 12.47; Cl, 15.78; S, 14.27. Found (percent): C, 53.29; H, 3.87; N, 12.16; Cl, 15.88; S, 14.67.

Following the procedure of Preparations 1 and 2 but substituting other known representative 2H-1,4-benzodiazepin-2-ones such as:

(1) 7-bromo-1,3-dihydro-5-ethyl-2H-1,4-benzodiazepin-2-one,
(2) 9-chloro-1,3-dihydro-3-methyl-5-propyl-2H-1,4-benzodiazepin-2-one,
(3) 1,3-dihydro-5-(4-pyridyl)-9-trifluoromethyl-2H-1,4-benzodiazepin-2-one,
(4) 7-diethylamino-1,3-dihydro-9-ethoxy-3-methyl-5-(3-pyridyl)-2H-1,4-benzodiazepin-2-one,
(5) 1,3-dihydro-7-ethoxy-5-(2-pyrryl)-2H-1,4-benzodiazepin-2-one,
(6) 1,3-dihydro-8-ethylthio-9-nitro-(2-pyrimidyl)-2H-1,4-benzodiazepin-2-one,
(7) 7-chloro-1,3-dihydro-5-(2-pyridyl)-2H-1,4-benzodiazepin-2-one,
(8) 1,3-dihydro-3-ethyl-7-fluoro-5-(2-guryl)-9-methylthio-2H-1,4-benzodiazepin-2-one,
(9) 1,3-dihydro-7-ethyl-5-(3-furyl)-8-propoxy-2H-1,4-benzodiazepin-2-one,
(10) 7-bromo-1,3-dihydro-9-dimethylamino-5-(2-pyrryl)-2H-1,4-benzodiazepin-2-one,
(11) 1,3-dihydro-8-nitro-5-(2-thienyl)-9-trifluoromethyl-2H-1,4-benzodiazepin-2-one,
(12) 7-chloro-1,3-dihydro-5-(1-propenyl)-3-propyl-2H-1,4-benzodiazepin-2-one,
(13) 1,3-dihydro-5-isopropenyl-7-methoxy-2H-1,4-benzodiazepin-2-one,
(14) 7-bromo-1,3-dihydro-5-vinyl-2H-1,4-benzodiazepin-2-one,
(15) 5-cyclopentyl-7-diethylamino-1,3-dihydro-9-fluoro-2H-1,4-benzodiazepin-2-one,
(16) 5-cyclohexyl-1,3-dihydro-3-ethyl-7-methoxy-2H-1,4-benzodiazepin-2-one,
(17) 5-cycloheptyl-1,3-dihydro-7-ethoxy-3-propyl-2H-1,4-benzodiazepin-2-one,
(18) 7-bromo-1,3-dihydro-5-(1-cyclopentenyl)-8-propoxy-2H-1,4-benzodiazepin-2-one,
(19) 8-chloro-1,3-dihydro-5-(1-cyclohexenyl)-7-diethylamino-3-methyl-2H-1,4-benzodiazepin-2-one and
(20) 1,3-dihydro-5-(1-cycloheptenyl)-7-ethylthio-8-fluoro-3-propyl-2H-1,4-benzodiazepin-2-one, there can be produced, respectively, (1) 7-bromo-1,3-dihydro-5-ethyl-2H-1,4-benzodiazepine-2-thione,
(2) 9-chloro-1,3-dihydro-3-methyl-5-propyl-2H-1,4-benzodiazepine-2-thione,
(3) 1,3-dihydro-5-(4-pyridyl)-9-trifluoromethyl-2H-1,4-benzodiazepine-2-thione,
(4) 7-diethylamino-1,3-dihydro-9-ethoxy-3-methyl-5-(3-pyridyl)-2H-1,4-benzodiazepine-2-thione,
(5) 1,3-dihydro-7-ethoxy-5-(2-pyrryl)-2H-1,4-benzodiazepine-2-thione,
(6) 1,3-dihydro-8-ethylthio-9-nitro-5-(2-pyrimidyl)-2H-1,4-benzodiazepine-2-thione,
(7) 7-chloro-1,3-dihydro-5-(2-pyridyl)-2H-1,4-benzodiazepine-2-thione,
(8) 1,3-dihydro-3-ethyl-7-fluoro-5-(2-furyl)-9-methylthio-2H-1,4-benzodiazepine-2-thione,
(9) 1,3-dihydro-7-ethyl-5-(3-furyl)-8-propoxy-2H-1,4-benzodiazepine-2-thione,
(10) 7-bromo-1,3-dihydro-9-dimethylamino-5-(2-pyrryl)-2H-1,4-benzodiazepine-2-thione,
(11) 1,3-dihydro-8-nitro-5-(2-thienyl)-9-trifluoromethyl-2H-1,4-benzodiazepine-2-thione,
(1) 7-chloro-1,3-dihydro-5-(1-propenyl)-3-propyl-2H-1,4-benzodiazepine-2-thione,
(13) 1,3-dihydro-5-isopropenyl-7-methoxy-2H-1,4-benzodiazepine-2-thione,
(14) 7-bromo-1,3-dihydro-5-vinyl-2H-1,4-benzodiazepine-2-thione,
(15) 5-cyclopentyl-7-diethylamino-1,3-dihydro-9-fluoro-2H-1,4-benzodiazepine-2-thione,
(16) 5-cyclohexyl-1,3-dihydro-3-ethyl-7-methoxy-2H-1,4-benzodiazepine-2-thione,
(17) 5-cycloheptyl-1,3-dihydro-7-ethoxy-3-propyl-2H-1,4-benzodiazepine-2-thione,
(18) 7-bromo-1,3-dihydro-5-(1-cyclopentenyl)-8-propoxy-2H-1,4-benzodiazepine-2-thione,
(19) 8-chloro-1,3-dihydro-5-(1-cyclohexenyl)-7-diethylamino-3-methyl-2H-1,4-benzodiazepine-2-thione and
(20) 1,3-dihydro-5-(1-cycloheptenyl)-7-ethylthio-8-fluoro-3-propyl-2H-1,4-benzodiazepine-2-thione.

EXAMPLE 1

8-bromo-6-(2-pyridyl)-4H-s-triazolo[4,3-a] [1,4]benzodiazepine (I)

A solution of 5 g. of 1,3-dihydro-7-bromo-5-(2-pyridyl)-2H - 1,4 - benzodiazepine-2-thione, (from Preparation 1) and 3 g. of formic acid hydrazide in 200 ml. of 1-butanol is heated under reflux for 3 hours 45 minutes with a slow stream of nitrogen passing through the reaction mixture to remove the hydrogen sulfide formed. The reaction mixture is concentrated, and the residue is suspended in water. The solid is collected by filtration, dissolved in methylene chloride and dried over anhydrous potassium carbonate. Removal of the solvent gives a residue which is recrystallized from ethyl acetate-Skellysolve B hexanes to give 8-bromo - 6 - (2 - pyridyl)-4H-s-triazolo[4,3-a][1,4]benzodiazepine (I).

Following the procedure of Example 1 but substituting other representative 1,3-dihydro-2H-1,4-benzodiazepine-2-thiones such as:

(1) 7-chloro-1,3-dihydro-5-ethyl-2H-1,4-benzodiazepine-2-thione,
(2) 9-bromo-1,3-dihydro-3,5-dimethyl-2H-1,4-benzodiazepine-2-thione,
(3) 1,3-dihydro-5-(4-pyridyl)-8-trifluoromethyl-2H-1,4-benzodiazepine-2-thione,
(4) 7,9-diethoxy-1,3-dihydro-8-dimethylamino-3-ethyl-(3-pyridyl)-2H-1,4-benzodiazepine-2-thione,
(5) 1,3-dihydro-7-methoxy-5-(2-pyrryl)-2H-1,4-benzodiazepine-2-thione, (6) 1,3-dihydro-8-propylthio-9-nitro-5-(2-pyrimidyl)-2H-1,4-benzodiazepine-2-thione,
(7) 7-chloro-1,3-dihydro-3-ethyl-8-fluoro-5-(2-furyl)-9-methylthio-2H-1,4-benzodiazepine-2-thione,
(8) 1,3-dihydro-8-ethyl-5-(3-furyl)-9-methoxy-2H-1,4-benzodiazepine-2-thione,
(9) 7-chloro-1,3-dihydro-9-diethylamino-6-(2-pyrryl)-2H-1,4-benzodiazepine-2-thione,
(10) 1,3-dihydro-9-nitro-5-(2-thienyl)-8-trifluoromethyl-2H-1,4-benzodiazepine-2-thione,
(11) 7-bromo-1,3-dihydro-5-(1-propenyl)-3-propyl-2H-1,4-benzodiazepine-2-thione,
(12) 1,3-dihydro-5-isopropenyl-7-methoxy-2H-1,4-benzodiazepine-2-thione,
(13) 7-chloro-1,3-dihydro-8-ethoxy-5-vinyl-2H-1,4-benzodiazepine-2-thione,
(14) 5-cyclopentyl-7-diethylamino-1,3-dihydro-2H-1,4-benzodiazepine-2-thione,
(15) 5-cycloheptyl-1,3-dihydro-7-methoxy-3-methyl-2H-1,4-benzodiazepine-2-thione,
(16) 7-chloro-1,3-dihydro-5-(1-cyclopentenyl)-8-ethoxy-2H-1,4-benzodiazepine-2-thione, there can be produced, respectively,
(1) 8-chloro-6-ethyl-4H-s-triazolo[4,3-a][1,4]benzodiazepine (I),
(2) 10-bromo-4,6-dimethyl-4H-s-triazolo[4,3-a][1,4]benzodiazepine (I),
(3) 6-(4-pyridyl)-9-trifluoromethyl-4H-s-triazolo[4,3-a][1,4]benzodiazepine (1),
(4) 8,10-diethoxy-9-dimethylamino-4-ethyl-6-(3-pyridyl)-4H-s-triazolo[4,3-a][1,4]benzodiazepine (I),
(5) 8-methoxy-6-(2-pyrryl)-4H-s-triazolo[4,3-a][1,4]benzodiazepine (I),
(6) 9-propylthio-10-nitro-6-(2-pyrimidyl)-4H-s-triazolo[4,3-a][1,4]benzodiazepine (I),
(7) 8-chloro-4-ethyl-9-fluoro-6-(2-furyl)-10-methylthio-4H-s-triazolo[4,3-a][1,4]benzodiazepine (I),
(8) 9-ethyl-6-(3-furyl)-10-methoxy-4H-s-triazolo[4,3-a][1,4]benzodiazepine (I),
(9) 8-chloro-10-diethylamino-6-(2-pyrryl)-4H-s-triazolo[4,3-a][1,4]benzodiazepine (I),
(10) 10-nitro-6-(2-thienyl)-9-trifluoromethyl-4H-s-triazolo[4,3-a][1,4]benzodiazepine (I),
(11) 8-bromo-6-(1-propenyl)-4-propyl-4H-s-triazolo[4,3-a][1,4]benzodiazepine (I),
(12) 6-isopropenyl-8-methoxy-4H-s-triazolo[4,3-a][1,4]benzodiazepine (I),
(13) 8-chloro-9-ethoxy-6-vinyl-4H-s-triazolo[4,3-a][1,4]benzodiazepine (I),
(14) 6-cyclopentyl-8-diethylamino-4H-s-triazolo[4,3-a][1,4]benzodiazepine (I),
(15) 6-cycloheptyl-8-methoxy-4-methyl-4H-s-triazolo[4,3-a][1,4]benzodiazepine (I),
(16) 8-chloro-6-(1-cyclopentenyl)-9-ethoxy-4H-s-triazolo[4,3-a][1,4]benzodiazepine (I) and
(17) 6-(1-cycloheptenyl)-4,9-dimethyl-8-methylthio-4H-s-triazolo[4,3-a][1,4]benzodiazepine (I).

EXAMPLE 2

8-bromo-1-chloro-6-(2-pyridyl)-4H-s-triazolo-[4,3-a][1,4]benzodiazepine (II)

A stirred mixture of 3 g. of 8-bromo-6-(2-pyridyl)-4H-s-triazolo[4,3-a][1,4]benzodiazepine (I) (prepared as in Example 1), 1.5 g. of N-chlorosuccinimide and 200 ml. carbon tetrachloride is refluxed under a nitrogen atmosphere for about 7 hours and kept at ambient temperature for about 16 hours. Water and enough chloroform to dissolve the precipitated product are added to the mixture and the layers are separated. The aqueous layer is extracted with chloroform and the combined organic solution is dried over anhydrous potassium carbonate and concentrated. The residue is chromatographed on 200 g. of silica gel with 1% methanol-99% chloroform. The product obtained from the column is crystallized from ethyl acetate to give 8-bromo-1-chloro-6-(2-pyridyl)-4H-s-triazolo[4,3-a][1,4]benzodiazepine (II).

Following the procedure of Example 2 but substituting other representative 6 - substituted-4H-s-triazolo[4,3-a]-[1,4]benzodiazepines (I) such as:

(1) 9-chloro-6-methyl-4H-s-triazolo[4,3-a][1,4]benzodiazepine (I),
(2) 9-bromo-4,6-diethyl-4H-s-triazolo[4,3-a][1,4]benzodiazepine (I),
(3) 6-(3-pyridyl)-8-trifluoromethyl-4H-s-triazolo[4.3-a][1,4]benzodiazepine (I),
(4) 8,9-dimethoxy-10-dipropylamino-4-propyl-6-(4-pyridyl)-4H-s-triazolo[4,3-a][1,4]benzodiazepine (I),
(5) 9-ethoxy-8-nitro-6-(2-pyrryl)-4H-s-triazolo[4,3-a]-[1,4]benzodiazepine (I),
(6) 8-chloro-9-methylthio-6-(2-pyrimidyl)-4H-s-triazolo[4,3-a][1,4]benzodiazepine (I),
(7) 8-bromo-4-ethyl-10-fluoro-6-(2-furyl)-9-methylthio-4H-s-triazolo[4,3-a][1,4]benzodiazepine (I),
(8) 8-chloro-10-dipropylamino-6-(3-furyl)-4H-s-triazolo[4,3-a][1,4]benzodiazepine (I),
(9) 8-bromo-9-nitro-6-(2-pyrryl)-4H-s-triazolo[4,3-a]-[1,4]benzodiazepine (I),
(10) 10-methoxy-6-(2-thienyl)-8-trifluoromethyl-4H-s-triazolo[4,3-a][1,4]benzodiazepine (I),
(11) 8-chloro-6-(1-propenyl)-4-propyl-4H-s-triazolo-[4,3-a][1,4]benzodiazepine (I),
(12) 6-isopropenyl-8-propoxy-4H-s-triazolo[4,3-a]-[1,4]benzodiazepine (I),
(13) 8-chloro-9-methoxy-6-vinyl-4H-s-triazolo[4,3-a]-[1,4]benzodiazepine (I),
(14) 6-cyclohexyl-9-dipropylamino-4H-s-triazolo-[4,3-a][1,4]benzodiazepine (I),
(15) 6-cycloheptyl-8-ethoxy-4H-s-triazolo[4,3-a]-[1,4]benzodiazepine (I),
(16) 8-bromo-6-(1-cyclohexenyl)-10-ethoxy-4H-s-triazolo[4,3-a][1,4]benzodiazepine (I) and
(17) 6-(1-cyclopentenyl)-4-methyl-9-propylthio-4H-s-triazolo[4,3-a][1,4]benzodiazepine (I), there can be produced, respectively, (1) 1,9-dichloro-6-methyl-4H-s-triazolo[4,3-a][1,4]benzodiazepine (II),
(2) 9-bromo-1-chloro-4,6-diethyl-4H-s-triazolo[4,3-a]-[1,4]benzodiazepine (II),
(3) 1-chloro-6-(3-pyridyl)-8-trifluoromethyl-4H-s-triazolo[4,3-a][1,4]benzodiazepine (II),
(4) 1-chloro-8,9-dimethoxy-10-dipropylamino-4-propyl-6-(4-pyridyl)-4H-s-triazolo[4,3-a][1,4]benzodiazepine (II),
(5) 1-chloro-9-ethoxy-8-nitro-6-(2-pyrryl)-4H-s-triazolo[4,3-a][1,4]benzodiazepine (II),
(6) 1,8-dichloro-9-methylthio-6-(2-pyrimidyl)-4H-s-triazolo[4,3-a][1,4]benzodiazepine (II),
(7) 8-bromo-1-chloro-4-ethyl-10-fluoro-6-(2-furyl)-9-methylthio-4H-s-triazolo[4,3-a][1,4]benzodiazepine (II),
(8) 1,8-dichloro-10-dipropylamino-6-(3-furyl)-4H-s-triazolo[4,3-a][1,4]benzodiazepine (II),
(9) 8-bromo-1-chloro-9-nitro-6-(2-pyrryl)-4H-s-triazolo[4,3-a][1,4]benzodiazepine (II),
(10) 1-chloro-10-methoxy-6-(2-thienyl)-8-trifluoromethyl-4H-s-triazolo[4,3-a][1,4]benzodiazepine (II),
(11) 1,8-dichloro-6-(1-propenyl)-4-propyl-4H-s-triazolo[4,3-a][1,4]benzodiazepine (II),
(12) 1-chloro-6-isopropenyl-8-propoxy-4H-s-triazolo[4,3-a][1,4]benzodiazepine (II),
(13) 1,8-dichloro-9-methoxy-6-vinyl-4H-s-triazolo[4,3-a][1,4]benzodiazepine (II),
(14) 1-chloro-6-cyclohexyl-9-dipropylamino-4H-s-triazolo[4,3-a][1,4]benzodiazepine (II),
(15) 1-chloro-6-cycloheptyl-8-ethoxy-4H-s-triazolo[4,3-a][1,4]benzodiazepine (II),

(16) 8-bromo-1-chloro-6-(1-cyclohexenyl)-10-ethoxy-4H-s-triazolo[4,3-a][1,4]benzodiazepine (II) and
(17) 1 - chloro-6-(1-cyclopentenyl)-4-methyl-9-propyl-thio-4H-s-triazolo[4,3-a][1,4]benzodiazepine (II).

EXAMPLE 3

1,8-dibromo-6-(2-pyridyl)-4H-s-triazolo[4,3-a][1,4]
benzodiazepine (IIa)

A stirred mixture of 15 g. of 8-bromo-6-(2-pyridyl)-4H-s-triazolo[4,3-a][1,4]benzodiazepine (I) (prepared as in Example 1), 9 g. of N-bromosuccinimide and 1 liter of carbon tetrachloride is refluxed, under a nitrogen atmosphere for about 4 hours, cooled and concentrated in vacuo. The residue is mixed with water and extracted with chloroform. The extract is dried over anhydrous potassium carbonate and concentrated. Crystallization of the residue from ethyl acetate gives 1,8-dibromo-6-(2-pyridyl)-4H-s-triazolo[4,3-a][1,4]benzodiazepine (IIa).

Following the procedure of Example 3 but substituting other representative 6 - substituted - 4H-s-triazolo[4,3-a][1,4]benzodiazepine (I) such as:

(1) 10-chloro-6-ethyl-4H-s-triazolo[4,3-a][1,4]benzo-diazepine (I),
(2) 9-bromo-4,6-dimethyl-8-nitro-4H-s-triazolo[4,3-a][1,4]benzodiazepine (I),
(3) 6-(3-pyridyl)-9-trifluoromethyl-4H-s-triazolo-[4,3-a][1,4]benzodiazepine (I),
(4) 8,9-diethoxy-6-(2-pyrryl)-4H-s-triazolo[4,3-a][1,4]benzodiazepine (I),
(5) 8-chloro-9-ethylthio-4-methyl-6-(2-pyrimidyl)-4H-s-triazolo[4,3-a][1,4]benzodiazepine (I),
(6) 8-bromo-10-dipropylamino-6-(2-furyl)-4H-s-triazolo-[4,3-a][1,4]benzodiazepine (I),
(7) 9-chloro-10-ethoxy-6-(2-thienyl)-8-trifluoromethyl-4H-s-triazolo[4,3-a][1,4]benzodiazepine (I),
(8) 8-fluoro-6-(1-propenyl)-4-propyl-4H-s-triazolo-[4,3-a][1,4]benzodiazepine (I),
(9) 8-chloro-9-ethoxy-6-vinyl-4H-s-triazolo[4,3-a][1,4]benzodiazepine (I),
(10) 6-cyclopentyl-9-dimethylamino-4H-s-triazolo-[4,3-a][1,4]benzodiazepine (I) and
(11) 8-chloro-6-(2-cyclohexenyl)-9-fluoro-4-methyl-10-propylthio-4H-s-triazolo[4,3-a][1,4]benzo-diazepine (I), there can be produced, respectively, (1) 1-bromo-10-chloro-6-ethyl-4H-s-triazolo[4,3-a][1,4]benzodiazepine (IIa),
(2) 1,9-dibromo-4,6-dimethyl-8-nitro-4H-s-triazolo-[4,3-a][1,4]benzodiazepine (IIa),
(3) 1-bromo-6-(3-pyridyl)-9-trifluoromethyl-4H-s-triazolo[4,3-a][1,4]benzodiazepine (IIa),
(4) 1-bromo-8,9-diethoxy-6-(2-pyrryl)-4H-s-triazolo-[4,3-a][1,4]benzodiazepine (IIa),
(5) 1-bromo-8-1-chloro-9-ethylthio-4-methyl-6-(2-primidyl)-4H-s-triazolo[4,3-a][1,4]benzodiazepine (IIa),
(6) 1,8-dibromo-10-dipropylamino-6-(2-furyl)-4H-s-triazolo[4,3-a][1,4]benzodiazepine (IIa),
(7) 1-bromo-9-chloro-10-ethoxy-6-(2-thienyl)-8-trifluoromethyl-4H-s-triazolo[4,3-a][1,4-]benzodiazepine (II),
(8) 1-bromo-8-fluoro-6-(1-propenyl)-4-propyl-4H-s-triazolo[4,3-a][1,4]benzodiazepine (IIa),
(9) 1-bromo-8-chloro-9-ethoxy-6-vinyl-4H-s-triazolo [4,3-a][1,4]benzodiazepine (IIa),
(10) 1-bromo-6-cyclopentyl-9-dimethylamino-4H-s-triazolo[4,3-a][1,4]benzodiazepine (IIa) and
(11) 1-bromo-8-chloro-6-(2-cyclohexenyl)-9-fluoro-4-methyl-10-propylthio-4H-s-triazolo[4,3-a][1,4]benzodiazepine (IIa).

EXAMPLE 4

8-bromo-6-(2-pyridyl)-4H-s-triazolo[4,3-a][1,4]
benzodiazepine-1-carbonitrile (III)

A mixture of 7 g. of 1,8-dibromo-6-(2-pyridyl)-4H-s-triazolo[4,3-a][1,4]benzodiazepine (IIa) (prepared as in Example 3), 2 g. of cuprous cyanide and 50 ml. of dimethylformamide is heated at 150° C., under a nitrogen atmosphere for about 2 hours, cooled, poured into 25 ml. of 25% ethylenediamine and extracted with chloroform. The extract is washed successively with 25 ml. of 25% ethylenediamine, water and brine, dried over anhydrous potassium carbonate and concentrated. The residue is chromatographed on 500 g. of silica gel with 1% methanol-99% chloroform. The first material eluted from the column is the product which is crystallized from ethyl acetate-Skellysolve B hexanes to give 8-bromo-6-(2-pyridyl) - 4H-s-triazolo[3,4-a][1,4]benzodiazepine-1-carbonitrile (III).

Following the procedure of Example 4 but substituting other representative 1-bromo-6-substituted-4H-s-triazolo-[4,3-a][1,4]benzodiazepines (IIa) such as:

(1) 1-bromo-9-chloro-6-methyl-4H-s-triazolo[4,3-a][1,4]benzodiazepine (IIa),
(2) 1,8-dibromo-4-ethyl-6-propyl-9-nitro-44H-s-triazolo [4,3-a][1,4]benzodiazepine (IIa),
(3) 1-bromo-6-(4-pyridyl)-8-trifluoromethyl-4H-s-triazolo[4,3-a][1,4]benzodiazepine (IIa),
(4) 1-bromo-8-ethoxy-6-(2-pyrryl)-4H-s-triazolo [4,3-a][1,4]benzodiazepine (IIa),
(5) 1-bromo-9-fluoro-8-methylthio-6-(2-pyridmidyl)-4H-s-triazolo[4,3-a][1,4]benzodiazepine (IIa),
(6) 1,8-dibromo-10-diethylamino-6-(2-furyl)-4H-s-triazolo[4,3-a][1,4]benzodiazepine (IIa),
(7) 1-bromo-9-chloro-10-ethoxy-6-(2-thienyl)-4H-s-triazolo[4,3-a][1,4]benzodiazepine (IIa),
(8) 1-bromo-8-fluoro-9-methoxy-6-(1-propenyl)-4-propyl-4H-s-triazolo[4,3-a][1,4]benzodiazepine (IIa),
(9) 1-bromo-6-cyclohexyl-8-diethylamino-4H-s-triazolo-[4,3-a][1,4]benzodiazepine (IIa) and
(10) 1-bromo-8-chloro-6-(1-cyclohexenyl-9-ethylthio-10-fluoro-4-methyl-4H-s-triazolo[4,3-a][1,4]benzo-diazepine (IIa), there can be produced, respectively, (1) 9-chloro-6-methyl-4H-s-triazolo[4,3-a][1,4]benzo-diazepine-1-carbonitrile (III),
(2) 8-bromo-4-ethyl-6-propyl-9-nitro-4H-s-triazolo [4,3-a][1,4]benzodiazepine-1-carbonitrile (III),
(3) 6-(4-pyridyl)-8-trifluoromethyl-4H-s-triazolo [4,3-a][1,4]benzodiazepine-1-carbonitrile (III),
(4) 8-ethoxy-6-(2-pyrryl)-4H-s-triazolo[4,3-a][1,4]
benzodiazepine-1-carbonitrile (III),
(5) 9-fluoro-8-methylthio-6-(2-pyrimidyl)-4H-s-triazolo [4,3-a][1,4]benzodiazepine-1-carbonitrile (III),
(6) 8-bromo-10-diethylamino-6-(2-furyl)-4H-s-triazolo [4,3-a][1,4]benzodiazepine-1-carbonitrile (III),
(7) 9-chloro-10-ethoxy-6-(2-thienyl)-4H-s-triazolo [4,3-a][1,4]benzodiazepine-1-carbonitrile (III),
(8) 8-fluoro-9-methoxy-6-(1-propenyl)-4-propyl-4H-s-triazolo[4,3-a][1,4]benzodiazepine-1-carbonitrile (III),
(9) 6-cyclohexyl-8-diethylamino-4H-s-triazolo[4,3-a][1,4]benzodiazepine-1-carbonitrile (III) and
(10) 8-chloro-6-(1-cyclohexenyl)-9-ethylthio-10-fluoro-4-methyl-4H-s-triazolo[4,3-a][1,4]benzodiazepine-1-carbonitrile (III).

EXAMPLE 5

8-bromo-1-methoxy-6-(2-pyridyl)-4H-s-triazolo[4,3-a][1,4]benzodiazepine (IV)

A mixture of 0.4 g. of 1,8-dibromo-6-(2-pyridyl)-4H-s-triazolo[4,3-a][1,4]benzodiazepine (IIa) (prepared as in Example 3) and a solution of sodium methoxide (prepared from 0.07 g. of sodium in 10 ml. of methanol) is refluxed under nitrogen for about 45 minutes and poured into ice water. This mixture is extracted with methylene chloride. The extract is dried over anhydrous potassium carbonate and concentrated. The thus-obtained residue is crystallized from ethyl acetate-Skellysolve B hexanes to give 8-bromo - 1 - methoxy-6-(2-pyridyl)-4H - s - triazolo [4,3-a][1,4]benzodiazepine (IV).

Following the procedure of Example 5 but substituting other representative 1-bromo - 6 - substituted-4H - s - triazolo[4,3-a][1,4]benzodiazepines (IIa), other alkali metal lower alkoxides and other lower alkanols, such as:

(1) 1-bromo-6-ethyl-9-fluoro-4H-s-triazolo[4,3-a][1,4]benzodiazepine (IIa), sodium ethoxide and ethanol,
(2) 1-bromo-4-ethyl-6-(2-pyridyl)-8-trifluoromethyl-4H-s-triazolo[4,3-a][1,4]benzodiazepine (IIa), sodium propoxide and 1-propanol,
(3) 1-bromo-8-methoxy-6-(2-pyrryl)-4H-s-triazolo [4,3-a][1,4]benzodiazepine (IIa), sodium isopropoxide and 2-propanol,
(4)-1-bromo-9-chloro-10-ethylthio-6-(2-pyrimidyl)-4H-s-triazolo[4,3-a][1,4]benzodiazepine (IIa), sodium ethoxide and ethanol,
(5) 1,8-dibromo-10-nitro-6-(2-furyl)-4H-s-triazolo [4,3-a][1,4]benzodiazepine (IIa), potassium methoxide and methanol,
(6) 1-bromo-9-fluoro-10-propoxy-6-(2-thienyl)-4H-s-triazolo[4,3-a][1,4]benzodiazepine (IIa), potassium propoxide and 1-propanol,
(7) 1-bromo-8-chloro-9-methoxy-6-(1-propenyl)-4-propyl-4H-s-triazolo[4,3-a][1,4]benzodiazepine (IIa), potassium methoxide and methanol, and
(8) 1-bromo-8-chloro-6-(1-cycloheptenyl)-9-dimethylamino-10-nitro-4H-s-triazolo[4,3-a][1,4]benzodiazepine (IIa), potassium ethoxide and ethanol, there can be produced, respectively, (1) 1-ethoxy-6-ethyl-9-fluoro-4H-s-triazolo[4,3-a][1,4]benzodiazepine (IV),
(2) 4-ethyl-1-propoxy-6-(2-pyridyl)-8-trifluoromethyl-4H-s-triazolo[4,3-a][1,4]benzodiazepine (IV),
(3) 1-isopropoxy-8-methoxy-6-(2-pyrryl)-4H-s-triazolo[4,3-a][1,4]benzodiazepine (IV),
(4) 9-chloro-1-ethoxy-10-ethylthio-6-(2-pyrimidyl)-4H-s-triazolo[4,3-a][1,4]benzodiazepine (IV),
(5) 8-bromo-1-methoxy-10-nitro-6-(2-furyl)-4H-s-triazolo[4,3-a][1,4]benzodiazepine (IV),
(6) 1,10-dipropoxy-9-fluoro-6-(2-thienyl)-4H-s-triazolo[4,3-a][1,4]benzodiazepine (IV),
(7) 8-chloro-1,9-dimethoxy-6-(1-propenyl)-4-propyl-4H-s-triazolo[4,3-a][1,4]benzodiazepine (IV), and
(8) 8-chloro-6-(1-cycloheptenyl)-9-dimethylamino-1-ethoxy-10-nitro-4H-s-triazolo[4,3-a][1,4]benzodiazepine (IV).

EXAMPLE 6

8-bromo-1-diethylamino-6-(2-pyridyl)-4H-s-triazolo[4,3-a][1,4]benzodiazepine (V)

A mixture of 8 g. of 1,8-dibromo-6-(2-pyridyl)-4H-s-triazolo[4,3-a][1,4]benzodiazepine (prepared as in Example 3), 5 g. of diethylamine and 50 ml. of dimethylformamide is heated to 80° C. for about 8 hours. The mixture is allowed to cool, then poured into 200 ml. of cold water and extracted with three 100-ml. portions of chloroform. The extracts are combined, dried over anhydrous potassium carbonate, and evaporated. The thus obtained residue is crystallized from ethyl acetate-Skellysolve B hexanes to give pure 8-bromo-1-diethylamino-6-(2-pyridyl)-4H-s-triazolo[4,3-a][1,4]benzodiazepine (V).

Following the procedure of Example 6 but substituting other representative 1-bromo-6-substituted-4H-s-triazolo [4,3-a][1,4]benzodiazepines (IIa) such as:

(1) 1-bromo-8-chloro-6-ethyl-4H-s-triazolo[4,3-a][1,4] benzodiazepine (IIa),
(2) 1-bromo-6-(3-pyridyl)-9-trifluoromethyl-4H-s-triazolo[4,3-a][1,4]benzodiazepine (IIa),
(3) 1-bromo-8-propoxy-6-(2-pyrryl)-4H-s-triazolo [4,3-a][1,4]benzodiazepine (IIa),
(4) 1-bromo-9-chloro-4-propyl-6-(2-pyrimidyl)-4H-s-triazolo[4,3-a][1,4]benzodiazepine (IIa),
(5) 1,8-dibromo-9-diethylamino-6-(2-furyl)-4H-s-triazolo[4,3-a][1,4]benzodiazepine (IIa),
(6) 1-bromo-8-chloro-9-ethoxy-6-(2-thienyl)-4H-s-triazolo[4,3-a][1,4]benzodiazepine (IIa),
(7) 1-bromo-8-chloro-9-fluoro-4-methyl-6-vinyl-4H-s-triazolo[4,3-a][1,4]benzodiazepine (IIa), and
(8) 1-bromo-9-chloro-6-(1-cyclohexenyl)-8-methylthio-4H-s-(triazolo[4,3-a][1,4]benzodiazepine (IIa), there can be produced, respectively, (1) 8-chloro-1-diethylamino-6-ethyl-4H-s-triazolo [4,3-a][1,4]benzodiazepine (V),
(2) 1-diethylamino-6-(3-pyridyl)-9-trifluoromethyl-4H-s-triazolo[4,3-a][1,4]benzodiazepine (V),
(3) 1-diethylamino-8-propoxy-6-(2-pyrryl)-4H-s-triazolo[4,3-a][1,4]benzodiazepine (V),
(4) 9-chloro-1-diethylamino-4-propyl-6-(2-pyrimidyl)-4H-s-triazolo[4,3-a][1,4]benzodiazepine (V),
(5) 1,9-bis(diethylamino)-8-bromo-6-(2-furyl)-4H-s-triazolo[4,3-a][1,4]benzodiazepine (V),
(6) 8-chloro-1-diethylamino-9-ethoxy-6-(2-thienyl)-4H-s-triazolo[4,3-a][1,4]benzodiazepine (V),
(7) 8-chloro-1-diethylamino-9-fluoro-4-methyl-6-vinyl-4H-s-triazolo[4,3-a][1,4]benzodiazepine (V), and
(8) 9-chloro-6-(1-cyclohexenyl)-1-diethylamino-8-methylthio-4H-s-triazolo[4,3-a][1,4]benzodiazepine (V).

EXAMPLE 7

8-bromo-1-dipropylamino-6-(2-pyridyl)-4H-s-triazolo[4,3-a][1,4]benzodiazepine (V)

To a solution of 0.003 mole of dipropylamine and 0.003 mole of butyl lithium in 75 ml. of hexamethyl phosphoric acid triamide, 0.002 mole of 1,8-dibromo-6-(2-pyridyl)-4H-s-triazolo[4,3-a][1,4]benzodiazepine (IIa) is added and the mixture kept at 60° C. for 15 hours. The mixture is then poured into water and extracted with chloroform. The extracts are dried over potassium carbonate, evaporated to dryness and the resulting residue recrystallized from ethyl acetate-Skellysolve B hexanes to give 8-bromo-1 - dipropylamino-6-(2-pyridyl)-4H-s-triazolo[4,3-a][1,4] benzodiazepine (V).

Following the procedure of Example 7 but substituting other representative 1-bromo-6-substituted-4H-s-triazolo [4,3-a][1,4]benzodiazepines (IIa) such as:

(1) 1-bromo-8-chloro-4,6-dimethyl-4H-s-triazolo [4,3-a][1,4]benzodiazepine (IIa),
(2) 1-bromo-6-(3-pyridyl)-9-trifluoromethyl-4H-s-triazolo[4,3-a][1,4]benzodiazepine (IIa),
(3) 1-bromo-8-methoxy-6-(2-pyrryl)-4H-s-triazolo [4,3-a][1,4]benzodiazepine (IIa),
(4) 1-bromo-9-chloro-8-ethylthio-6-(2-pyrimidyl)-4H-s-triazolo[4,3-a][1,4]benzodiazepine (IIa),
(5) 1,8-dibromo-10-dipropylamino-6-(2-furyl)-4H-s-triazolo[4,3-a][1,4]benzodiazepine (IIa),
(6) 1-bromo-8-chloro-9-methoxy-6-(2-thienyl)-4H-s-triazolo[4,3-a][1,4]benzodiazepine (IIa),
(7) 1-bromo-6-cyclopentyl-8-dipropylamino-4H-s-triazolo[4,3-a][1,4]benzodiazepine (IIa) and
(8) 1-bromo-6-(1-cycloheptenyl)-8-ethylthio-4-propyl-4H-s-triazolo[4,3-a][1,4]benzodiazepine (IIa), there can be produced, respectively, (1) 8-chloro-4,6-dimethyl-1-dipropylamino-4H-s-triazolo[4,3-a][1,4]benzodiazepine (V),
(2) 1-dipropylamino-6-(3-pyridyl)-9-trifluoromethyl-4H-s-triazolo[4,3-a][1,4]benzodiazepine (V),
(3) 1-dipropylamino-8-methoxy-6-(2-pyrryl)-4H-s-triazolo[4,3-a][1,4]benzodiazepine (V),
(4) 9-chloro-1-dipropylamino-8-ethylthio-6-(2-pyrimidyl)-4H-s-triazolo[4,3-a][1,4]benzodiazepine (V), (5) 1,10-bis(dipropylamino)-8-bromo-6-(2-furyl)-4H-s-triazolo[4,3-a][1,4]benzodiazepine (V),
(6) 8-chloro-1-dipropylamino-9-methoxy-6-(2-thienyl)-4H-s-triazolo[4,3-a][1,4]benzodiazepine (V),
(7) 1,8-bis(dipropylamino)-6-cyclopentyl-4H-s-triazolo[4,3-a][1,4]benzodiazepine (V) and
(8) 6-(1-cycloheptenyl)-1-dipropylamino-8-ethylthio-4-propyl-4H-s-triazolo[4,3-a][1,4]benzodiazepine (V).

Following the procedures of the immediately preceding paragraph and of Example 7, but substituting diisopropylamine or diethylamine, yields the 1-diisopropylamino and 1-diethylamino counterparts of the compounds of Formula V prepared therein.

EXAMPLE 8

8-bromo-1-dimethylamino-6-(2-pyridyl)-4H-s-triazolo[4,3-a][1,4]benzodiazepine (V)

1,8 - dibromo-6-(2-pyridyl)-4H-s-triazolo[4,3-a][1,4]-benzodiazepine (IIa) prepared as in Example 3) is dispersed in dimethylformamide saturated with dimethylamine. The mixture is introduced into a heavy gauge tube, the tube sealed and heated for about 14 hours at about 65° C. After cooling, the tube is opened, the reaction mass is poured into water and the mixture extracted with chloroform. The chloroform extract is dried over anhydrous magnesium sulfate, evaporated and the resulting residue recrystallized from ethyl acetate to give pure 8-bromo - 1 - dimethylamino-6-(2-pyridyl) - 4H-s-triazolo[4,3-a][1,4]benzodiazepine (V).

Following the procedure of Example 8 but substituting other representative 1-bromo-6-substituted-4H-s-triazolo-[4,3-a][1,4]benzodiazepines (IIa) such as:

(1) 1-bromo-8-chloro-6-methyl-4H-s-triazolo[4,3-a]-[1,4]benzodiazepine (IIa),
(2) 1,10-dibromo-4,6-dimethyl-4H-s-triazolo[4,3-a]-[1,4]benzodiazepine (IIa),
(3) 1-bromo-8-ethoxy-6-(3-pyridyl)-9-trifluoromethyl-4H-s-triazolo[4,3-a][1,4]benzodiazepine (IIa),
(4) 1-bromo-8-methoxy-6-(2-pyrryl)-4H-s-triazolo-[4,3-a][1,4]benzodiazepine (IIa),
(5) 1-bromo-9-chloro-10-nitro-6-(2-pyrimidyl)-4H-s-triazolo[4,3-a][1,4]benzodiazepine (IIa),
(6) 1-bromo-8-chloro-4-ethyl-9-fluoro-6-(2-furyl)-10-propylthio-4H-s-triazolo[4,3-a][1,4]benzodiazepine (IIa),
(7) 1-bromo-10-nitro-6-(2-thienyl)-4H-s-triazolo-[4,3-a][1,4]benzodiazepine (IIa),
(8) 1,8-dibromo-6-(1-propenyl)-4-propyl-4H-s-triazolo[4,3-a][1,4]benzodiazepine (IIa),
(9) 1-bromo-6-cycloheptyl-8-ethoxy-4H-s-triazolo-[4,3-a][1,4]benzodiazepine (IIa) and
(10) 1-bromo-6-(1-cycloheptenyl)-4-methyl-8-methylthio-4H-s-triazolo[4,3-a][1,4]benzodiazepine (IIa), there can be produced, respectively, (1) 8-chloro-1-dimethylamino-6-methyl-4H-s-triazolo-[4,3-a][1,4]benzodiazepine (V),
(2) 10-bromo-4,6-dimethyl-1-dimethylamino-4H-s-triazolo[4,3-a][1,4]benzodiazepine (V),
(3) 1-dimethylamino-8-ethoxy-6-(3-pyridyl)-9-trifluoromethyl-4H-s-triazolo[4,3-a][1,4]benzodiazepine (V),
(4) 1-dimethylamino-8-methoxy-6-(2-pyrryl)-4H-s-triazolo[4,3-a][1,4]benzodiazepine (V),
(5) 9-chloro-1-dimethylamino-10-nitro-6-(2-pyrimidyl)-4H-s-triazolo[4,3-a][1,4]benzodiazepine (V),
(6) 8-chloro-1-dimethylamino-4-ethyl-9-fluoro-6-(2-furyl)-10-propylthio-4H-s-triazolo[4,3-a][1,4]benzodiazepine (V),
(7) 1-dimethylamino-10-nitro-6-(2-thienyl)-4H-s-triazolo[4,3-a][1,4]benzodiazepine (V),
(8) 8-bromo-1-dimethylamino-6-(1-propenyl)-4-propyl-4H-s-triazolo[4,3-a][1,4]benzodiazepine (V),
(9) 6-cycloheptyl-1-dimethylamino-8-ethoxy-4H-s-triazolo[4,3-a][1,4]benzodiazepine (V) and
(10) 6-(1-cycloheptenyl)-1-dimethylamino-4-methyl-8-methylthio-4H-s-triazolo[4,3-a][1,4]benzodiazepine (V).

EXAMPLE 9

8-bromo-6-(2-pyridyl)-1-pyrrolidino-4H-s-triazolo[4,3-a][1,4]benzodiazepine (V)

A stirred mixture of 0.4 g. of 1,8-dibromo-6-(2-pyridyl) - 4H - s - triazolo[4,3-a][1,4]benzodiazepine (IIa) (prepared as in Example 3) in 2.5 ml. of pyrrolidine is refluxed for about 5 hours under nitrogen. The resulting solution is allowed to remain for about 18 hours at room temperature and then poured into ice water. The resulting solids are collected by filtration, washed with water and dried in vacuo to give the crude product (V). This product, combined with a chloroform extract obtained from extracting the filtrate is suspended in dilute base and then extracted with methylene chloride. This extract is washed with aqueous brine, dried over anhydrous potassium carbonate and concentrated in vacuo to give a residue. This residue is redissolved in toluene and again concentrated in vacuo to give a residue which is crystallized from methanol-methylene chloride to give a by-product.

The mother liquor is concentrated, the resulting residue redissolved and decolorized with activated charcoal (Darco G–60) concentrated again and the residue therefrom recrystallized from ethyl acetate-Skellysolve B hexanes to give pure 8-bromo-6-(2-pyridyl)-1-pyrrolidino-4H-s-triazolo[4,3-a][1,4]benzodiazepine (V).

Following the procedure of Example 9 but substituting piperidine or morpholine yields, respectively, 8-bromo-1-piperidino-6-(2-pyridyl)-4H - s-triazolo[4,3-a][1,4]benzodiazepine (V) and 8-bromo-1-morpholino-6-(2-pyridyl)-4H-s-triazolo[4,3-a][1,4]benzodiazepine (V).

Following the procedures of the immediately preceding paragraph and Example 9, but substituting other representative 1-bromo-6-substituted-4H-s-triazolo[4,3-a][1,4]benzodiazepines (IIa) and cyclic amines such as:

(1) 1-bromo-9-chloro-6-methyl-4H-s-triazolo[4,3-a][1,4]benzodiazepine (IIa) and pyrrolidine,
(2) 1,8-dibromo-4,6-diethyl-9-nitro-4H-s-triazolo[4,3-a][1,4]benzodiazepine (IIa) and piperidine,
(3) 1-bromo-9-propoxy-6-(4-pyridyl)-4H-s-triazolo[4,3-a][1,4]benzodiazepine (IIa) and morpholine,
(4) 1-bromo-8-ethoxy-6-(2-pyrryl)-4H-s-triazolo[4,3-a][1,4]benzodiazepine (IIa) and pyrrolidine,
(5) 1-bromo-8,9-dichloro-4-methyl-6-(2-pyrimidyl)-4H-s-triazolo[4,3-a][1,4]benzodiazepine (IIa) and piperidine,
(6) 1,8-dibromo-9-diethylamino-6-(2-furyl)-4H-s-triazolo[4,3-a][1,4]benzodiazepine (IIa) and morpholine,
(7) 1-bromo-8-chloro-10-propoxy-6-(2-thienyl)-9-trifluoromethyl-4H-s-triazolo[4,3-a][1,4]benzodiazepine (IIa) and pyrrolidine,
(8) 1-bromo-9-fluoro-4-propyl-6-vinyl-4H-s-triazolo-[4,3-a][1,4]benzodiazepine (IIa) and piperidine,
(9) 1-bromo-9-chloro-6-cyclohexyl-4H-s-triazolo[4,3-a][1,4]benzodiazepine (IIa) and morpholine, and
(10) 1-bromo-6-(1-cycloheptenyl)-8-fluoro-4-methyl-4H-s-triazolo[4,3-a][1,4]benzodiazepine (IIa) and pyrrolidine, there can be produced, respectively,
(1) 9-chloro-6-methyl-1-pyrrolidino-4H-s-triazolo[4,3-a][1,4]benzodiazepine (V),
(2) 8-bromo-4,6-diethyl-9-nitro-1-piperidino-4H-s-triazolo[4,3-a][1,4]benzodiazepine (V),
(3) 1-morpholino-9-propoxy-6-(4-pyridyl)-4H-s-triazolo[4,3-a][1,4]benzodiazepine (V),
(4) 8-ethoxy-1-pyrrolidino-6-(2-pyrryl)-4H-s-triazolo[4,3-a][1,4]benzodiazepine (V), (5) 8,9-dichloro-4-methyl-1-piperidino-6-(2-pyrimidyl)-4H-s-triazolo[4,3-a][1,4]benzodiazepine (V),
(6) 8-bromo-9-diethylamino-6-(2-furyl)-1-morpholino-4H-s-triazolo[4,3-a][1,4]benzodiazepine (V),
(7) 8-chloro-10-propoxy-1-pyrrolidino-6-(2-thienyl)-9-trifluoromethyl-4H-s-triazolo[4,3-a][1,4]benzodiazepine (V),
(8) 9-fluoro-1-piperidino-4-propyl-6-vinyl-4H-s-triazolo[4,3-a][1,4]benzodiazepine (V),
(9) 9-chloro-6-cyclohexyl-1-morpholino-4H-s-triazolo[4,3-a][1,4]benzodiazepine (V) and
(10) 6-(1-cycloheptenyl)-8-fluoro-4-methyl-1-pyrrolidino-4H-s-triazolo[4,3-a][1,4]benzodiazepine (V).

What is claimed is:
1. 1,8-dibromo-6-(2-pyridyl)-4H-s-triazolo[4,3-a][1,4]benzodiazepine.
2. 8-bromo-1-chloro-6-(2-pyridyl)-4H-s-triazolo[4,3-a][1,4]benzodiazepine.
3. 8-bromo-1-cyano-6-(2-pyridyl)-4H-s-triazolo[4,3-a][1,4]benzodiazepine.
4. 8-bromo-1-methoxy - 6-(2-pyridyl) - 4H-s-triazolo[4,3-a][1,4]benzodiazepine.
5. 8-bromo-1-dimethylamino - 6-(2-pyridyl)-4H-s-triazolo[4,3-a][1,4]benzodiazepine.

References Cited
UNITED STATES PATENTS
3,523,947  8/1970  Derieq et al. _____ 260—256.4

OTHER REFERENCES
Ger. Offen. 2,012,190, Sept. 24, 1970; Chem. Abst. 73:109801v (1970).
Ger. Offen. 2,055,889, May 27, 1971; Chem. Abst. 75:76853z (1971).
Ger. Offen. 2,056,174, Aug. 24, 1971; Chem. Abst. 75:98599y (1971).

HENRY R. JILES, Primary Examiner

G. TODD, Assistant Examiner

U.S. Cl. X.R.
260—247.1, 247.5 R, 256.4 R, 293.59, 294.8, 296 T, 308 R, 999

UNITED STATES PATENT OFFICE
CERTIFICATE OF CORRECTION

Patent No. 3,767,660  Dated October 23, 1973

Inventor(s) Jackson B. Hester, Jr.

It is certified that error appears in the above-identified patent and that said Letters Patent are hereby corrected as shown below:

Column 1, line 49, "selecte dfrom" should read -- selected from --. Column 5, line 49, "11a" should read -- 11a --. Column 7, line 47, "nitro-(2-" should read -- nitro-5-(2- --; line 51, "guryl" should read -- furyl --. Column 8, line 26, "(1)" should read -- (12) --. Column 11, line 23, "benzodiazepine" should read -- benzodiazepines --; line 59, "1-bromo-8-1-chloro" should read -- 1-bromo-8-chloro --. Column 12, line 18, "[3,4-a]" should read -- [4,3-a] --; line 25, "44H" should read -- 4H --. Column 14, line 11, "s-(triazolo" should read -- s-triazolo --.

Signed and sealed this 3rd day of December 1974.

(SEAL)
Attest:

McCOY M. GIBSON JR.
Attesting Officer

C. MARSHALL DANN
Commissioner of Patents